United States Patent
Zhao et al.

(10) Patent No.: US 11,308,330 B2
(45) Date of Patent: Apr. 19, 2022

(54) METHOD AND DEVICE FOR CONSTRUCTING AUTONOMOUS DRIVING TEST SCENES, TERMINAL AND READABLE STORAGE MEDIA

(71) Applicant: CHANG'AN UNIVERSITY, ShaanXi (CN)

(72) Inventors: Xiangmo Zhao, ShaanXi (CN); Runmin Wang, ShaanXi (CN); Yu Zhu, ShaanXi (CN); Wenshuai Zhou, ShaanXi (CN); Zhigang Xu, ShaanXi (CN); Zhanwen Liu, ShaanXi (CN); Jingjun Cheng, ShaanXi (CN); Lan Yang, ShaanXi (CN); Pengpeng Sun, ShaanXi (CN)

(73) Assignee: CHANG'AN UNIVERSITY, Xi'an (CN)

( * ) Notice: Subject to any disclaimer, the term of this patent is extended or adjusted under 35 U.S.C. 154(b) by 0 days.

(21) Appl. No.: 17/134,399

(22) Filed: Dec. 26, 2020

(65) Prior Publication Data

US 2022/0004769 A1  Jan. 6, 2022

(51) Int. Cl.
*G06K 9/00* (2022.01)
*G06K 9/62* (2022.01)
*B60W 60/00* (2020.01)

(52) U.S. Cl.
CPC ....... *G06K 9/00718* (2013.01); *B60W 60/001* (2020.02); *G06K 9/00791* (2013.01); *G06K 9/6277* (2013.01)

(58) Field of Classification Search
CPC ........... G06K 9/00718; G06K 9/00791; G06K 9/6277; B60W 60/001
See application file for complete search history.

(56) References Cited

U.S. PATENT DOCUMENTS

| | | | |
|---|---|---|---|
| 2019/0156151 A1* | 5/2019 | Wrenninge | G06K 9/6256 |
| 2021/0110089 A1* | 4/2021 | Chen | G06K 9/6273 |
| 2021/0241156 A1* | 8/2021 | Lai | G06F 17/10 |

FOREIGN PATENT DOCUMENTS

| | | |
|---|---|---|
| CN | 109446371 A | 3/2019 |
| CN | 110009765 A | 7/2019 |
| CN | 111179585 A | 5/2020 |

OTHER PUBLICATIONS

A Versatile Approach to Evaluating and Testing Automated Vehicles based on Kernel Methods Zhiyuan Huang1, Yaohui Guo2, Henry Lam3, and Ding Zhao. (Year: 2017).*

* cited by examiner

*Primary Examiner* — Dhaval V Patel (57) ABSTRACT

Provided are a method and a device for constructing autonomous driving test scenes, a terminal and a readable storage media. Primitive scenes are extracted from real traffic scenes to establish a primitive scene description model. The values of the description variables are selected from distribution intervals of the description variables of the primitive scenes, and the description variables are randomly sampled based on the distribution of the description variables to generate test primitive scenes by adopting an importance sampling based Monte Carlo method. The test primitive scenes are recombined according to the parameters of the elements of the test scene to generate the test scene. The present invention can directly simulate the actual complex system, so as to avoid the result distortion caused by the simplification of the complex system.

10 Claims, 4 Drawing Sheets

FIG. 6

METHOD AND DEVICE FOR CONSTRUCTING AUTONOMOUS DRIVING TEST SCENES, TERMINAL AND READABLE STORAGE MEDIA

CROSS-REFERENCE TO RELATED APPLICATIONS

This application claims the benefit of priority from Chinese Patent Application No. 202010625061.2, filed on Jul. 1, 2020. The content of the aforementioned application, including any intervening amendments thereto, is incorporated herein by reference in its entirety.

TECHNICAL FIELD

The present application relates to automatic driving tests, and more particularly to a method and a device for constructing autonomous driving test scenes, a terminal and a readable storage media.

BACKGROUND

As an intelligent transport, an autonomous vehicle incorporates environmental perception, planning and decision-making, and control execution, and is the strategic target in automobile technologies. The development of key technologies allows the autonomous vehicles to make a great contribution for solving problems such as traffic accidents, traffic congestion, environmental pollution, and energy shortages. A scientific test and evaluation system is essential to improve the efficiency of research and development of the autonomous vehicle, perfect relevant laws and regulations, and promote the development of intelligent transport.

In addition, traditional vehicles are tested through an independent driver-vehicle test, while the autonomous vehicle is tested through a system in which the driver, the vehicle, the road and the surrounding are strongly coupled. Therefore, the traditional road test is not suitable for the testing of the autonomous vehicle. A scene-based virtual test technology is flexible in configuring test scenes, and has high test efficiency, strong test repeatability, safe test process and low test cost. The scene-based virtual test technology can realize automatic tests and accelerated tests. In addition, the virtual test system can simulate dangerous scenes or extreme scenes that are difficult to achieve in the actual vehicle test, which can greatly reduce the difficulty, risk and workload of the test. The scene-based virtual testing has become an indispensable part in the testing and evaluation of the autonomous vehicles. However, there is no method to generate test scenes of the autonomous driving, so real transport scenes cannot be effectively simulated. Therefore, there is an urgent need to obtain a test scene generating method which can ensure the validity and coverage of the test scenes of the autonomous driving.

SUMMARY

In order to overcome the defects of the prior art, the present disclosure aims to provide a method and a device for constructing autonomous driving test scenes, a terminal and a readable storage media.

Technical solutions of this application are specifically described as follows to achieve the above objective.

Provided is a method for constructing autonomous driving test scenes based on primitive scenes, comprising:

S1: extracting primitive scenes from real traffic scenes to establish a primitive scene description model, and estimating the distribution of description variables of the primitive scenes in the primitive scene description model using Gaussian Mixture Model;

S2: selecting values of the description variables from distribution intervals of the description variables of the primitive scenes according to the primitive scene description model, and randomly sampling the description variables based on the distribution of the description variables to generate test primitive scenes by adopting an importance sampling based Monte Carlo method; and S3: determining parameters of elements of a test scene according to a test task, and recombining the test primitive scenes generated in S2 according to the parameters of the elements of the test scene to generate the test scene.

In some embodiments, the real traffic scenes are decomposed into a plurality of independent primitives; and the independent primitives are modeled and parameterized.

In some embodiments, the primitive scene description model is established to describe a probability distribution of the description variables of the primitive scenes; the Gaussian Mixture Model is adopted to estimate the distribution of the description variables of the primitive scenes;

X is supposed to be a random variable to be estimated, and the Gaussian Mixture Model of X is expressed as:

$$p(x) = \sum_{k=1}^{N} \alpha_k N(x \mid \mu_k, \Sigma_k);$$

wherein $N(x|\mu_k,\Sigma_k)$ is the $k^{th}$ component in the Gaussian Mixture Model, $\alpha_k$ is the mixing coefficient which satisfies $$\sum_{k=1}^{N} \alpha_k = 1, \alpha_k \in [0, 1];$$

during the parameter estimation, data generally obeys the Gaussian mixture distribution, and the probability distribution is represented by the Gaussian Mixture Model; the primitive scene description model includes N groups of unknown parameters $(\mu_k,\Sigma_k,\alpha_k)$; and values of the parameters of the primitive scene description model are determined according to the sample data.

In some embodiments, the unknown parameters are subject to iterative calculation through an EM (Expectation-Maximization) algorithm to obtain optimal unknown parameters $(\mu,\Sigma,\alpha)$.

In some embodiments, the iterative calculation comprises:
1) setting initial values of $(\mu,\Sigma,\alpha)$ for each sample point $x^i$;
2) calculating a posterior probability $Q_i(z^k)=(z^k|x^i;\mu,\Sigma,\alpha)$ of each sample point $x^i$ according to the values of $(\mu,\Sigma,\alpha)$;
3) calculating and updating the values of $(\mu,\Sigma,\alpha)$ according to the posterior probability; and
4) calculating a likelihood function l by using the updated parameters of $(\mu,\Sigma,\alpha)$ if the likelihood function converges to maximum likelihood estimation, obtaining optimal values of $(\mu,\Sigma,\alpha)$ wise, returning to step 2 for iterative calculation.

In some embodiments, when calculating the posterior probability for each sample point $x^i$, the posterior probability is fixed to solve for the maximum likelihood estimation of $P(x;\mu,\Sigma,\alpha)$;

a likelihood function of $P(x;\mu,\Sigma,\alpha)$ is expressed as:

$$l = \sum_{i=1}^{n} \sum_{k=1}^{N} Q_i(z^k) \ln \frac{P(x^i, z^k; \mu, \Sigma, \alpha)}{Q_i(z^k)};$$

a derivative of l with respect to $\mu_k$ is found, and the derivative of l is set to 0 to solve for $\mu_k$:

$$\mu_k = \frac{\sum_{i=1}^{n} Q_i(z^k)x_i}{\sum_{i=1}^{n} Q_i(z^k)};$$

similarly, the derivative of l with respect to $\Sigma_k$ and $\alpha_k$ is found, respectively, and the derivative of l is set to 0 to solve for $\Sigma_k$ and $\alpha_k$:

$$\Sigma_k = \frac{\sum_{i=1}^{n} Q_i(z^k)(x_i - \mu_k)(x_i - \mu_k)^T}{\sum_{i=1}^{n} Q_i(z^k)};$$

$$\alpha_k = \frac{\sum_{i=1}^{n} Q_i(z^k)}{n}.$$

In some embodiments, Monte Carlo method is adopted for the random sampling to generate the primitive scenes;

a random variable X is supposed to represent scenes generated by the Monte Carlo method; x is a scene sample of X and obeys the distribution of a probability density function $f(x)$; W is supposed to be a set of high-risk scenes; in order to select the high-risk scenes from the generated scenes, an indicator function h(x) of the high-risk scenes is defined as:

$$h(x) = \begin{cases} 1, & x \in W \\ 0, & x \notin W; \end{cases}$$

an expectation of the indicator function h(x) in an overall scene C is $\mu$, and a variance is $\sigma^2$;

under the condition of importance sampling, the expectation $\mu$ is expressed as:

$$\mu = \int h(x)f(x)dx$$
$$= \int h(x)\frac{f(x)}{g(x)}g(x)dx$$
$$= \int (h(x)\omega(w))g(x)dx;$$

a probability of occurrence of the high-risk scenes in the overall scene is supposed to be p, and the expectation $\mu$ of h(x) is equal to p, and the variance $\sigma^2$ is equal to p(1−p); g(x) is the distribution with a higher probability of occurrence of the high-risk scenes, where $$\omega(x) = \frac{f(x)}{g(x)}$$

is called an importance ratio;

the Monte Carlo method is adopted to generate n groups of scene samples $x_i$, i=1, . . . , n; when a sample size is large, in terms of the law of Large Numbers, a sample mean $\hat{\mu}$ of h(x) is converged to the expectation $\mu$ with the probability of 1, and a Monte Carlo estimator $\hat{\mu}_{IS}$ of the expectation $\mu$ of the h(x) is expressed as:

$$\hat{\mu}_{IS} = \frac{1}{n}\sum_{i=1}^{n} h(x_i)\omega(x_i), \, x_i \sim g(x).$$

The present disclosure further provides a device for constructing autonomous driving test scenes based on primitive scenes, comprising:

a primitive extraction module, configured to extract primitive scenes from real traffic scenes to establish a primitive scene description model;

a variable estimation module, configured to estimate the distribution of description variables of the primitive scenes in the primitive scene description model by using a Gaussian Mixture Model;

a primitive scene generation module, configured to select values of description variables from distribution intervals of the description variables of the primitive scenes according to the primitive scene description model, and randomly sample the description variables by adopting an importance sampling based Monte Carlo method to generate test primitive scenes; and a test scene generation module, configured to determine parameters of elements of a test scene according to a test task, and recombine the parameters of the elements of the test primitive scenes to generate the test scene.

The present disclosure further provides a terminal, comprising:

a storage device;
a processor; and
a computer program stored in the storage device and executed by the processor;

wherein the computer program, when executed by the processor, causes the processor to execute the method for constructing autonomous driving test scenes.

The present disclosure further comprises a computer-readable storage medium having a computer program stored thereon, wherein the computer program causes the processor to execute the method for constructing autonomous driving test scenes.

Compared with the prior art, the present invention has the following beneficial effects.

The present invention provides a method for constructing autonomous driving test scenes based on primitive scenes. Primitive scenes are extracted from real traffic scenes to establish a primitive scene description model. The values of the description variables are selected from distribution intervals of the description variables of the primitive scenes according to the primitive scene description model, and the description variables are randomly sampled based on the distribution of the description variables to generate test primitive scenes by adopting an importance sampling based Monte Carlo method. Parameters of elements of a test scene are determined according to a test task, and the test primitive scenes generated in S2 are recombined according to the parameters of the elements of the test scene to generate the test scene. The test scene is generated based on real data, and provides scientific support for the test scene generation method. The method ensures the test scenes can effectively simulate the real traffic scenes while meeting the coverage requirements of the test scene. The present invention can directly simulate the actual complex system, so as to avoid the result distortion caused by the simplification of the complex system. In addition, the error has nothing to do with the dimension of problems, so that the rapid increasing of numerical solution errors of the high-dimensional problems is avoided, thereby avoiding the curse of dimensionality. The present invention adopts a reinforcement generation method of high-risk scenes. More high-risk scenes are generated with relatively small computing overhead, which can effectively increase the number of high-risk scenes in the generated scenes, reduce the number of low-risk scenes, thereby improving the efficiency of testing.

In addition, variance reduction methods, such as importance sampling, can be adopted to reduce the error of Monte Carlo estimator, and generate more high-risk scenes with less computational overhead.

DETAILED DESCRIPTION OF EMBODIMENTS

The present disclosure provides a method for constructing autonomous driving test scenes based on primitive scenes, including the follow steps.

S1: Primitive scenes are extracted from real traffic scenes. Specifically, the real traffic scenes are decomposed into a plurality of independent primitives, and then the independent primitives are modeled and parameterized to establish a primitive scene description model.

S2: Values of description variables are selected from the distribution intervals of the description variables of the primitive scenes according to the primitive scene description model, and the importance sampling based Monte Carlo method is adopted to randomly sample the description variables based on the distribution of the description variables to generate a test primitive scene. The generation of the test primitive scene is the inverse process of the primitive scene extraction. Multiple primitive scenes which meet the requirements of field test can be obtained through the generation of test primitive scenes, where the number of generated primitive scenes is far more than actually collected primitive scenes.

S3: According to parameters of elements of the test scene, the test primitive scenes generated in S2 are recombined to generate the test scene. The test scene is constructed by determining the parameters of the elements of the extracted test primitive scenes according to the test task, and recombining the test primitive scenes according to the set rules to form the test scene.

For different test objects, test methods and test content, the number of primitives in the test scene and the parameters of the elements can be flexibly controlled to construct the corresponding test scene to meet different test requirements.

Step 1 is specifically described below.

1) The establishment of the primitive scene description model aims to determine description variables of the primitive scenes and the relationship between the description variables by analyzing the change characteristics of the primitive scenes.

The primitive scene description model is established to describe the probability distribution of the description variables of the primitive scenes. The Gaussian Mixture Model is adopted herein to estimate the distribution of the description variables of the primitive scenes.

X is supposed to be a random variable to be estimated, and the related Gaussian Mixture Model is expressed as:

$$p(x) = \sum_{k=1}^{N} \alpha_k N(x \mid \mu_k, \Sigma_k);$$

where $N(x|\mu_k,\Sigma_k)$ is the $k^{th}$ component in the Gaussian Mixture Model, $\alpha_k$ is the mixing coefficient which satisfies $$\sum_{k=1}^{N} \alpha_k = 1, \alpha_k \in [0, 1].$$

During the parameter estimation, the data generally obeys the Gaussian mixture distribution, and the probability distribution is represented by the Gaussian Mixture Model in the above formula. The model includes N groups of unknown parameters $(\mu_k,\Sigma_k,\alpha_k)$. The parameter estimation is a process of determining the values of the parameters of the model according to the sample data.

The unknown parameters are subject to iterative calculation through the EM (Expectation-Maximization) algorithm to obtain optimal unknown parameters $(\mu,\Sigma,\alpha)$.

The samples are supposed to be $\{x^1, x^2, \ldots, x^n\}$. It is impossible to determine which component of the Gaussian Mixture Model the observed sample point belongs to. Therefore, an implicit random variable Z is introduced for illustration.

N-dimensional random variable Z is supposed to be $Z=(z_1, z_2, \ldots, z_N)$, $z_k \in \{0,1\}$. $z_k=1$ is supposed to represent that the sample point belongs to the $k^{th}$ model component, and $z_k=0$ represents that the sample point does not belong to the $k^{th}$ model component. For any sample point $x^i$, $Q_i(Z)$ represents the distribution of the implicit variable Z, and satisfies $$\sum_{k=1}^{N} Q_i(z^k) = 1, Q_i(z^k) \geq 0.$$

The EM algorithm is adopted to optimize the implicit variables and solve for the optimal value of the unknown parameters. Firstly, the probability distribution of the implicit variables should be determined; and the probability distribution of the total X is $P(x;\mu,\Sigma,\alpha)$; where $\mu,\Sigma,\alpha$ are parameters to be estimated. Because there is the implicit variable Z, the joint probability distribution of (X,Z) is $P(x,z;\mu,\Sigma,\alpha)$, and its likelihood function is expressed as:

$$L = \prod_{i=1}^{n} P(x^i, z; \mu, \Sigma, \alpha).$$

The likelihood function takes its logarithm to obtain:

$$l = \ln L = \sum_{i=1}^{n} \ln P(x^i, z; \mu, \Sigma, \alpha).$$

Due to $P(x^i, z; \mu, \Sigma, \alpha) = \sum_{k=1}^{N} P(x^i, z^k; \mu, \Sigma, \alpha)$, $$l = \sum_{i=1}^{n} \ln \sum_{k=1}^{N} P(x^i, z^k; \mu, \Sigma, \alpha)$$

$$= \sum_{i=1}^{n} \ln \sum_{k=1}^{N} Q_i(z^k) \frac{P(x^i, z^k; \mu, \Sigma, \alpha)}{Q_i(z^k)}.$$

If the logarithmic function is a concave function, Jensen's inequality is considered.

If the function $f$ is a concave function and X is a random variable, $$E[f(X)] \leq f(E[X])$$

If the function $f$ is a strictly concave function, the equal sign in the inequality holds if and only if $p(x=E[X])=1$, that is, when X is a constant.

Due to Jensen's inequality, $$l \geq \sum_{i=1}^{n} \sum_{k=1}^{N} Q_i(z^k) \ln \frac{P(x^i, z^k; \mu, \Sigma, \alpha)}{Q_i(z^k)}.$$

$$\frac{P(x^i, z^k; \mu, \Sigma, \alpha)}{Q_i(z^k)}$$

should be a constant in order to make the equal sign of Jensen's inequality hold, namely:

$$\frac{P(x^i, z^k; \mu, \Sigma, \alpha)}{Q_i(z^k)} = c;$$

-continued $$Q_i(z^k) = \frac{P(x^i, z^k; \mu, \Sigma, \alpha)}{c}.$$

Sum $z^k$ on both sides of the equation to obtain:

$$\sum_{k=1}^{N} Q_i(z^k) = \frac{\sum_{k=1}^{N} P(x^i, z^k; \mu, \Sigma, \alpha)}{c}.$$

Due to $\sum_{k=1}^{N} Q_i(z^k) = 1$, $$\sum_{k=1}^{N} P(x^i, z^k; \mu, \Sigma, \alpha) = c.$$

Therefore, $$Q_i(z^k) = \frac{P(x^i, z^k; \mu, \Sigma, \alpha)}{\sum_{k=1}^{N} P(x^i, z^k; \mu, \Sigma, \alpha)}$$

$$= \frac{P(x^i, z^k; \mu, \Sigma, \alpha)}{P(x^i; \mu, \Sigma, \alpha)}$$

$$= P(z^k | x^i; \mu, \Sigma, \alpha).$$

The above formula shows that the calculation form of $Q_i(z^k)$ is the posterior probability of $z^k$ at the sample point $x^i$.

After the calculation form of $Q_i(z^k)$ is determined, the EM algorithm can be adopted to obtain the optimal unknown parameters $(\mu,\Sigma,\alpha)$.

The iterative calculation of the EM algorithm are specifically described as follows.

1) For each sample $x^i$, initial values of $(\mu,\Sigma,\alpha)$ are set.

2) The posterior probability $Q_i(z^k)=(z^k|x^i;\mu,\Sigma,\alpha)$ of each sample point $x^i$ is calculated according to the current values of $(\mu,\Sigma,\alpha)$;

3) The parameter values of $(\mu,\Sigma,\alpha)$ are calculated and updated according to the current posterior probability; and the calculated posterior probability is fixed to solve for the maximum likelihood estimation of $P(x;\mu,\Sigma,\alpha)$.

The likelihood function of $P(x;\mu,\Sigma,\alpha)$ is expressed as:

$$l = \sum_{i=1}^{n} \sum_{k=1}^{N} Q_i(z^k) \ln \frac{P(x^i, z^k; \mu, \Sigma, \alpha)}{Q_i(z^k)}.$$

A derivative of l with respect to $\mu_k$ is found, and the derivative of l is set to 0 to solve for $\mu_k$:

$$\mu_k = \frac{\sum_{i=1}^{n} Q_i(z^k) x_i}{\sum_{i=1}^{n} Q_i(z^k)}.$$

Similarly, the derivative of l with respect to $\Sigma_k$ and $\alpha_k$ is found, respectively, and the derivative of l is set to 0 to solve for $\Sigma_k$ and $\alpha_k$:

$$\Sigma_k = \frac{\sum_{i=1}^{n} Q_i(z^k)(x_i - \mu_k)(x_i - \mu_k)^T}{\sum_{i=1}^{n} Q_i(z^k)};$$

$$\alpha_k = \frac{\sum_{i=1}^{n} Q_i(z^k)}{n}.$$

4) A likelihood function l is calculated by using the updated parameters $(\mu, \Sigma, \alpha)$ The likelihood function converges to the maximum likelihood estimation, that is, the updated likelihood function l remains unchanged or changes very little, which shows that the solve ford parameters $(\mu, \Sigma, \alpha)$ are the optimal parameters; otherwise, return to step 2 for the iterative calculation.

The generation of the primitive scenes of S2 includes the follow steps.

The Monte Carlo method can directly simulate the actual complex system, so it can effectively overcome result distortion caused by the simplification of the complex system, and the error is not related to the dimension of problems. In addition, the Monte Carlo method can solve for complex and high-dimensional problems. The Monte Carlo is adopted for randomly sampling to generate primitive scenes based on the distribution of description variables of the model.

The random variable X is supposed to represent the scenes generated by the Monte Carlo method. x is a scene sample of X, and obeys the distribution of the probability density function $f(x)$. W is supposed to a set of high-risk scenes. In order to select high-risk scenes from the generated scenes, an indicator function h(x) of the high-risk scenes is defined as:

$$h(x) = \begin{cases} 1, & x \in W \\ 0, & x \notin W. \end{cases}$$

The expectation of the indicator function h(x) in an overall scene C is $\mu$, and the variance is $\sigma^2$; and $\mu = \int h(x)f(x)dx.$ The probability of occurrence of the high-risk scenes in the overall scene is supposed to be p, and the expectation $\mu$ of h(x) is equal to p, and the variance $\sigma^2$ is equal to $p(1-p)$.

The Monte Carlo method is adopted to generate n groups of scene samples $x_i$, i=1, ..., n. When the sample size is large, in terms of the law of Large Numbers, the sample mean $\hat{\mu}$ of h(x) is converged to the expectation $\mu$ with a probability of 1, and the Monte Carlo estimator $\hat{\mu}$ of the expectation $\mu$ is expressed as:

$$\hat{\mu} = \frac{1}{n}\sum_{i=1}^{n} h(x_i), \; x_i \sim f(X).$$

In terms of the central-limit theorem, an absolute error between the Monte Carlo estimator $\hat{\mu}$ and the expectation $\mu$ is expressed as:

$$\varepsilon = |\hat{\mu} - \mu| = \frac{z_\alpha \sigma}{\sqrt{n}} = \frac{z_\alpha \sqrt{p(1-p)}}{\sqrt{n}}.$$

A relative error between the Monte Carlo estimator $\hat{\mu}$ and expectation $\mu$ is expressed as:

$$\varepsilon_\gamma = \frac{|\hat{\mu} - \mu|}{\hat{\mu}} = \frac{z_\alpha \sqrt{p(1-p)}}{\sqrt{n}\,\hat{\mu}};$$

where $z_\alpha$ is the normal standard deviation, and $\alpha$ is the confidence probability.

The above formula shows that the error of the Monte Carlo method is the probability error under the condition of confidence probability $\alpha$. The error of the Monte Carlo estimator $\hat{\mu}$ is proportional to the standard deviation $\sigma$ of h(x) and inversely proportional to the square root $\sqrt{n}$ of the number of the generated samples.

(2) There is a small probability of occurrence of the high-risk scenes in the real traffic environment, in which the Monte Carlo method may cause a large variance of the estimated value, thereby causing a large estimation error. In order to reduce the estimation error, a large number of scene samples need to be generated, which results a large computational overhead. In addition, the generated scenes include a large number of low-risk scenes and fewer high-risk scenes, which is not conducive to scene construction. Therefore, a variance reduction method such as importance sampling can be used to reduce the error of the Monte Carlo estimation value, so that more high-risk scenes are generated using less computational overhead.

The importance sampling can increase the proportion of low probability events in the sampling and the number of low probability events in the generated sample by selecting an appropriate distribution g(x) instead of the original probability, distribution $f(x)$ to reduce the variance and the total number of required samples. In the importance sampling based Monte Carlo method, the description variables are randomly sampled according to the distribution g(x) with higher probability of occurrence of high-risk scenes to generate n test scenes. The importance sampling only changes the probability distribution, not the statistical magnitude. Under the condition of importance sampling, the overall expectation $\mu$ is expressed as:

$$\mu = \int h(x)f(x)dx$$

$$= \int h(x)\frac{f(x)}{g(x)}g(x)dx$$

$$= \int (h(x)\omega(x))g(x)dx;$$

where $$\omega(x) = \frac{f(x)}{g(x)}$$

is called the importance ratio.

A Monte Carlo estimator $\widetilde{\mu}_{IS}$ of the expectation $\mu$ of h(x) is expressed as:

$$\widetilde{\mu}_{IS} = \frac{1}{n}\sum_{i=1}^{n} h(x_i)\omega(x_i), \; x_i \sim g(x).$$

When the sample size is large, in terms of the law of Large Numbers, a sample mean $\widehat{\mu_{l_s}}$ of h(x) is still converged to the overall expectation µ with the probability of 1.

Figure 1:
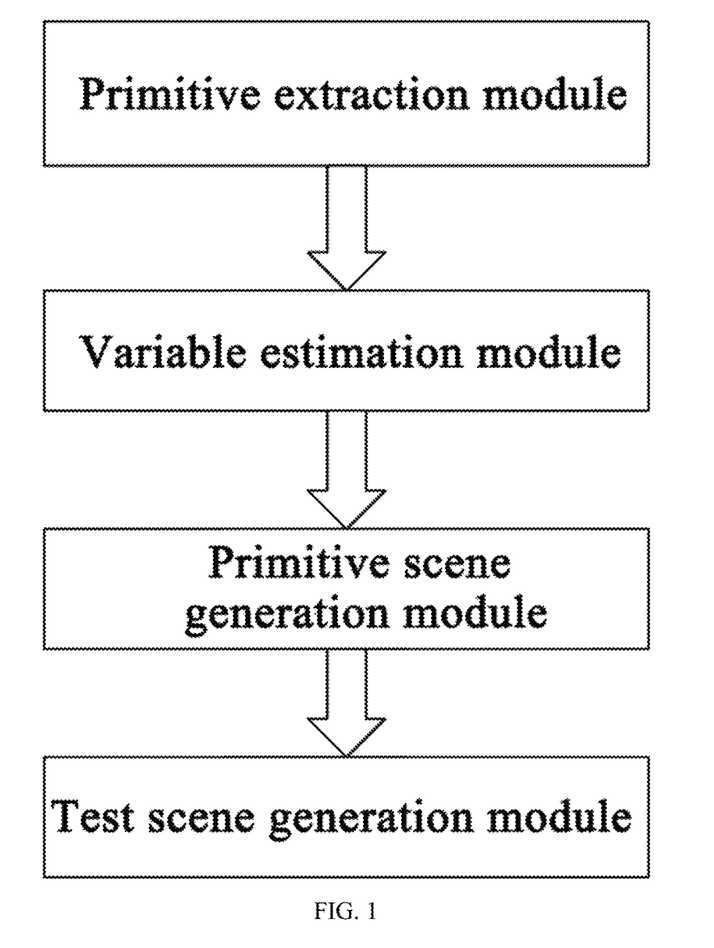
FIG. 1 is a schematic diagram of a device for constructing automatic driving test scenes according to an embodiment of the present disclosure.

As show in FIG. 1, the present disclosure further provides a device for constructing automatic driving test scenes based on primitive scenes, including:

a primitive extraction module, configured to extract primitive scenes from real traffic scenes to establish a primitive scene description model;

a variable estimation module, configured to estimate the distribution of description variables of the primitive scenes in the primitive scene description model by using a Gaussian Mixture Model;

a primitive scene generation module, configured to select description variables from distribution intervals of the description variables of the primitive scenes according to the primitive scene description model, and randomly sample the description variables according to the distribution of the description variable by adopting an importance sampling based Monte Carlo method to generate test primitive scenes; and a test scene generation module, configured to determine parameters of elements of the test scene according to a test task, and recombine the test primitive scenes to generate the test scene according to the parameters of the elements of the test scene.

The present disclosure further includes a terminal, including: a storage device, a processor, and a computer program stored in the storage device and executed by the processor. The computer program, when executed by the processor, causes the processor to execute the method for constructing autonomous driving test scenes.

The present disclosure further provides a computer-readable storage medium having a computer program stored thereon. The computer program causes the processor to execute the method for constructing autonomous driving test scenes.

Embodiment

In this embodiment, the selected test scene is a cut-in collision avoidance scene when the vehicle is driven on a straight-line highway. During scene modeling, the highD dataset is used as the source of real traffic data. The dataset is collected from a section of an approximately straight highway which has a length of about 420 m and includes 5 main carriageways. The acquisition time is 45 min, including non-rush hours and rush hours. The dataset provides detailed driving parameters of the position, the driving carriageway, the speed, and the acceleration that exceed that of observation vehicles in the acquisition area at an interval of 0.1 s.

Figure 2:
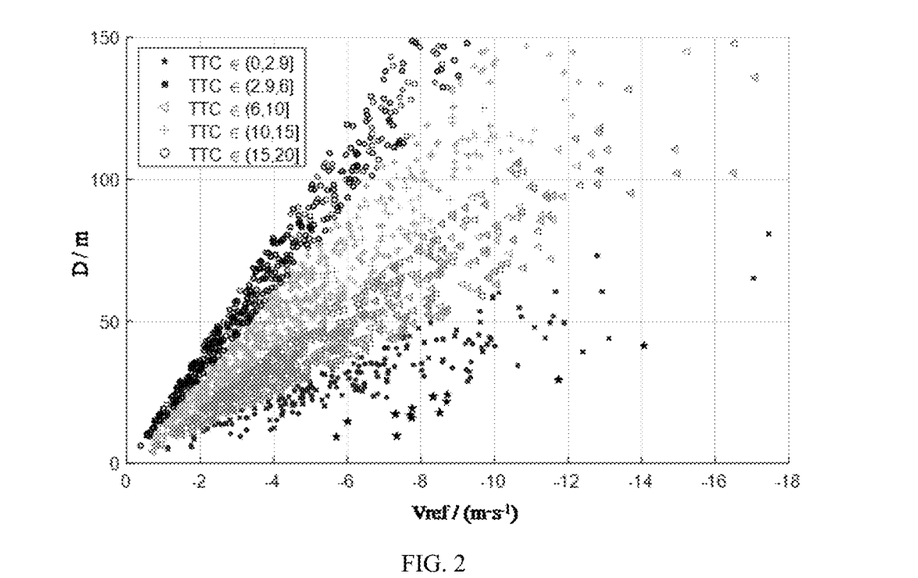
FIG. 2 is a diagram showing the primitive scene extraction result of a scene model that the vehicle ahead cuts into the highway according to an embodiment of the present disclosure.
Figure 3:
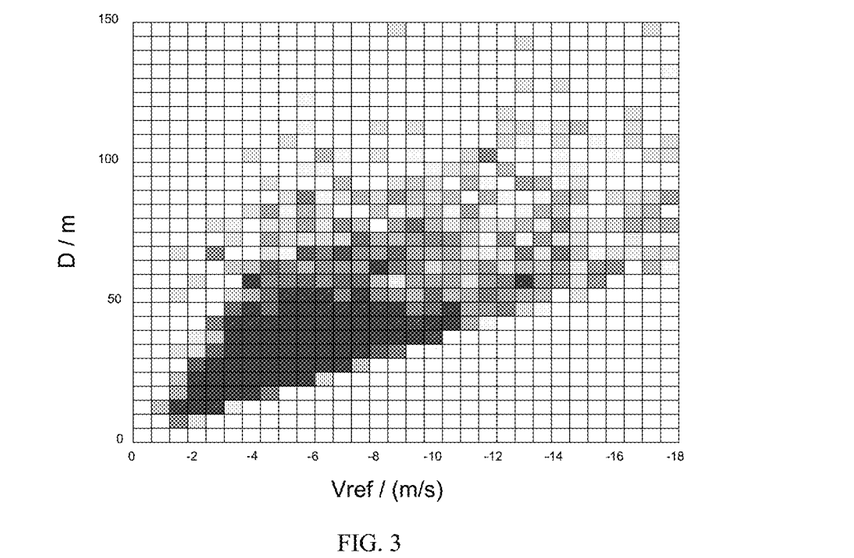
FIG. 3 is a diagram showing the distribution of 4,277 real primitive scenes according to an embodiment of the present disclosure.

According to the scene model that the vehicle ahead cuts into the highway, the corresponding data is extracted from the dataset. At $T_0$, the distance between the car A and the car B is D, the speed difference between the two cars is $V_{ref}=V_A-V_B$, and the time to collision is TTC. According to the TTC based Automatic Emergency Braking (AEB) collision avoidance algorithm, when TTC is less than 2.9 s, the system will issue a collision warning. When TTC is less than 1.9 s, the system will brake by 40%. When it is less than 0.9 s, the system will fully brake. Therefore, when TTC$\in$(0 s,2.9 s], the scene is set as a dangerous scene, Chinese national standard GB21670 stipulated that the braking deceleration of the vehicle is -6.43 m/s². Considering an extreme condition, when the vehicle on the highway drives at 100 km/h and the cut-in vehicle has a low speed, the time required for braking is not more than 4 s. Besides, considering response time of the system, the boundary condition is set to 6 s, so when TTC$\in$(2.9 s,6 s], the scene is set as a high-risk scene. When the vehicle on the highway is driven at 100 km/h and runs about 500 m in 20 s, which exceeds the sensing range of sensor systems such as laser radars. Therefore, the condition that the vehicle runs 500 m in 20 s or more is not considered, and when TTC$\in$(10 s,20 s], the condition is set as a low-risk scene. A total of 4,277 real scenes of two-car lane change were extracted from the highD dataset. As shown in FIG. 2, a point corresponds to an extracted cut-in scene. The black point indicates dangerous scenes are included, and there are 33 black points. The red point indicates that high-risk scenes are included, and there are 431 red points. The green and blue points indicate that low-risk scenes are included, and there are 2,492 green and blue points.

Figure 4:
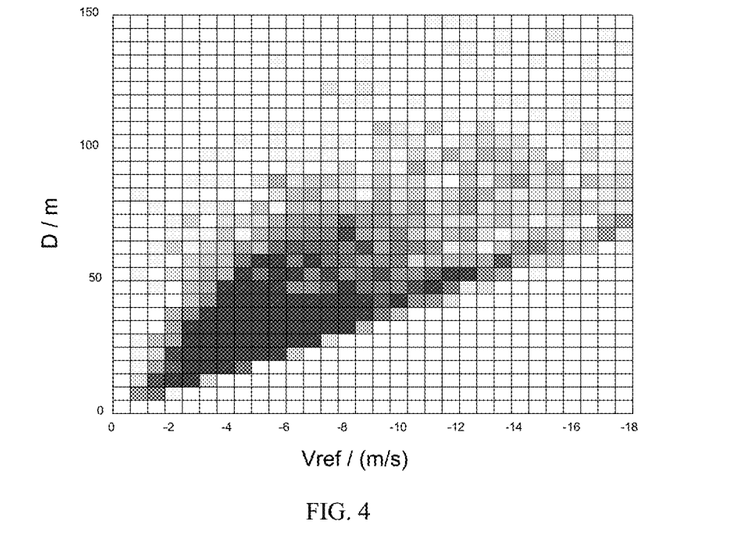
FIG. 4 is a diagram showing 277 primitive scenes generated by the Monte Carlo method according to an embodiment of the present disclosure.
Figure 5:
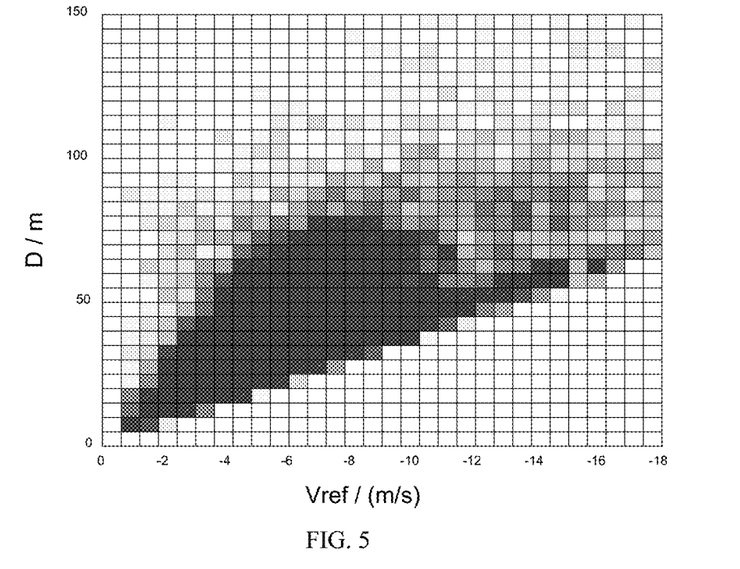
FIG. 5 is a diagram showing the distribution of 10,000 primitive scenes generated by the Monte Carlo method according to an embodiment of the present disclosure.
Figure 6:
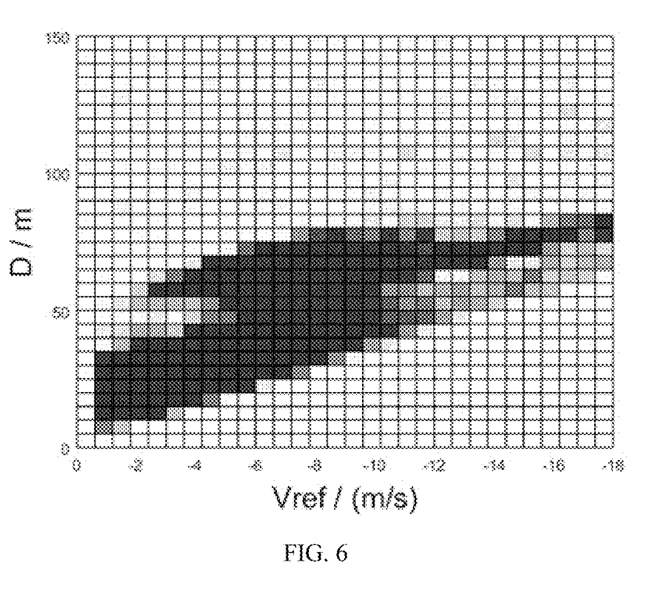
FIG. 6 is a diagram showing the distribution of 10,000 primitive scenes generated by the importance sampling based Monte Carlo method according to an embodiment of the present disclosure.

Based on the extraction of primitive scenes, the Monte Carlo method is adopted to generate primitive scenes. Combined with the scene description model, the feasible ranges of the selected parameters are D$\in$(0 m,150 m] and $V_{ref}\in$[-18 m/s, 0 m/s), respectively. 4,277 and 10,000 primitive scenes are generated respectively by the Monte Carlo method. The feasible ranges of parameters ($V_{ref}$ and D) are equally divided into 30 intervals, respectively, in order to show the generation of primitive scenes, and there are 900 intervals within the feasible range [$V_{ref}$,D]. The number of generated primitive scenes in each interval is shown in FIGS. 4 and 5.

As shown in Table 1, the interval is categorized according to the number of primitive scenes contained in the interval.

TABLE 1

4,277 real primitive scenes and the number of generated primitive scenes

| | The number of primitive scenes in the interval | | | | |
|---|---|---|---|---|---|
| | [1, 5) | [5, 10) | [10, 20) | [20, +∞) | Total |
| 4,277 real scenes instances | 127 | 69 | 62 | 69 | 327 |
| 4,277 generated primitive scenes | 198 | 79 | 60 | 62 | 399 |
| 10,000 generated primitive scenes | 185 | 80 | 94 | 132 | 491 |

Table 1 shows that the 4,277 real scenes contained in the highD dataset cover a total of 327 intervals, while the 4,277 generated primitive scenes cover a total of 399 intervals. Specifically, a total of 200 intervals in the covered intervals of the real scene instances include more than 5 scene instances, and a total of 201 intervals in the 4,277 generated primitive scenes include more than 5 primitive scenes. The real scene instances is compared with primitive scenes of the same number generated by the Monte Carlo method, which shows that the distribution estimation results of Gaussian Mixture Model based parameters are more accurate in primitive scene generation.

In addition, Table 2 shows the number of different types of scenes and feasible ranges of the corresponding TIC in the real scene instances and 10,000 generated primitive scenes. The real scene instances are compared to the primitive scenes generated by the Monte Carlo method, which can be seen that the proportion of the number of the real scene instances and the number of the generated primitive scenes is almost constant in different TIC intervals. The results show that the proportion of high-risk scenes cannot be increased by increasing the number of the primitive scenes without changing the distribution of the parameters.

TABLE 2

The results of the primitive scenes generated by the Monte Carlo method

| Primitive scenes | Classification | TTC | Number | Proportion in total |
|---|---|---|---|---|
| Dangerous scenes | Real scenes instances | (0 s, 0.9 s] | 0 | 0 |
| | 10,000 generated primitive scenes | | 12 | 0.12% |
| | Real scenes instances | (0.9 s, 1.9 s] | 6 | 0.14% |
| | 10,000 generated primitive scenes | | 22 | 0.22% |
| | Real scenes instances | (1.9 s, 2.9 s] | 27 | 0.63% |
| | 10,000 generated primitive scenes | | 65 | 0.65% |
| High-risk scenes | Real scenes instances | (2.9 s, 6 s] | 430 | 10.05% |
| | 10,000 generated primitive scenes | | 1021 | 10.21% |
| Low-risk scenes | Real scenes instances | (10 s, 20 s] | 2492 | 58.27% |
| | 10,000 generated primitive scenes | | 5645 | 56.45% |

In the primitive scenes generated by the Monte Carlo method, the dangerous scenes accounted for only 099% of the total of generated primitive scenes, and the high-risk primitive scenes accounted for 10.21% of the total of generated primitive scenes. Due to the low probability of occurrence of high-risk scenes in real traffic, the dangerous scenes and high-risk primitive scenes that are important to the field test of autonomous vehicles, accounted for a small proportion of primitive scenes generated by the Monte Carlo method. Therefore, more high-risk scenes are required to be generated in the generated primitive scene sets while meeting the requirements of the coverage of the scene, so as to ensure that the primitive scene sets completely covers the high-risk scenes in the real traffic environment. Therefore, the importance sampling based Monte Carlo method is adopted to generate the primitive scenes.

TABLE 3

The results of the primitive scenes generated by the importance sampling based Monte Carlo method

| Primitive scenes | TTC | Number | Proportion in total |
|---|---|---|---|
| Dangerous scenes | (0 s, 0.9 s] | 34 | 0.34% |
| | (0.9 s, 1.9 s] | 72 | 0.72% |
| | (1.9 s, 2.9 s] | 149 | 1.49% |
| High-risk scenes | (2.9 s, 6 s] | 2201 | 22.01% |
| Low-risk scenes | (10 s, 20 s] | 2475 | 24.75% |

As shown in Table 3, the proportion of the dangerous scenes and the high-risk scenes in the primitive scenes generated by the importance sampling based Monte Carlo method is significantly increased when other conditions remain unchanged. Compared the primitive scenes generated by the Monte Carlo method, the number of dangerous scenes increases by 157%, and the proportion in the total generated scenes increased to 2.55%. The number of the high-risk scenes increased by 115%, and the proportion in the total generated scenes increased to 22.01%. The results of the primitive scenes generated by the Monte Carlo method and the importance sampling based Monte Carlo method are compared. It can be seen that the number of the dangerous scenes and the high-risk scenes can be increased by using the importance sampling method based on the same number of generated primitive scenes, which can improve the coverage of primitive scene generation. The method is conductive to selecting and deploying high-risk scenes in the test site, so as to perform an enhanced automated driving test.

What is claimed is:

1. A method for constructing autonomous driving test scenes based on primitive scenes, comprising:
    S1: extracting primitive scenes from real traffic scenes to establish a primitive scene description model, and estimating the distribution of description variables of the primitive scenes in the primitive scene description model using Gaussian Mixture Model;
    S2: selecting values of the description variables from distribution intervals of the description variables of the primitive scenes according to the primitive scene description model, and randomly sampling the description variables based on the distribution of the description variables to generate a test primitive scene by adopting an importance sampling based Monte Carlo method; and
    S3: determining parameters of elements of a test scene according to a test task, and recombining the test primitive scenes generated in S2 according to the parameters of the elements of the test scene to generate the test scene.

2. The method of claim 1, wherein the real traffic scenes are decomposed into a plurality of independent primitives, and the independent primitives are modeled and parameterized.

3. The method of claim 1, wherein the primitive scene description model is established to describe a probability distribution of the description variables of the primitive scenes; the Gaussian Mixture Model is adopted to estimate the distribution of the description variables of the primitive scenes;
    X is supposed to be a random variable to be estimated, and the Gaussian Mixture Model of X is expressed as:

$$p(x) = \sum_{k=1}^{N} \alpha_k N(x \mid \mu_k, \Sigma_k);$$

wherein $N(x|\mu_k, \Sigma_k)$ is the $k^{th}$ component in the Gaussian Mixture Model, $\alpha_k$ is the mixing coefficient which satisfies $$\sum_{k=1}^{N} \alpha_k = 1, \alpha_k \in [0, 1];$$

during the parameter estimation, data generally obeys the Gaussian mixture distribution, and the probability distribution is represented by the Gaussian Mixture Model; the primitive scene description model contains N groups of unknown parameters ($\mu_k, \Sigma_k, \alpha_k$); and the values of parameters of the primitive scene description model are determined according to the sample data.

4. The method of claim 3, wherein the unknown parameters are subject to iterative calculation through an EM (Expectation-Maximization) algorithm to obtain optimal unknown parameters ($\mu, \Sigma, \alpha$).

5. The method of claim 4, wherein the iterative calculation comprises:
   1) setting an initial value of ($\mu, \Sigma, \alpha$) for each sample point $x^i$;
   2) calculating a posterior probability $Q_i(z^k) = (z^k | x^i; \mu, \Sigma, \alpha)$ of each sample point $x^i$ according to the value of ($\mu, \Sigma, \alpha$);
   3) calculating and updating the value of ($\mu, \Sigma, \alpha$) according to the posterior probability; and
   4) calculating a likelihood function l by using the updated parameters of ($\mu, \Sigma, \alpha$) if the likelihood function converges to maximum likelihood estimation, obtaining optimal value of ($\mu, \Sigma, \alpha$); otherwise, returning to step 2 for iterative calculation.

6. The method of claim 5, wherein when calculating the posterior probability for each sample point $x^i$, the posterior probability is fixed to solve for the maximum likelihood estimation of $P(x; \mu, \Sigma, \alpha)$;

a likelihood function of $P(x; \mu, \Sigma, \alpha)$ is expressed as:

$$l = \sum_{i=1}^{n} \sum_{k=1}^{N} Q_i(z^k) \ln \frac{P(x^i, z^k; \mu, \Sigma, \alpha)}{Q_i(z^k)};$$

a derivative of l with respect $\mu_k$ is found, and the derivative of l is set to 0 to solve for $\mu_k$:

$$\mu_k = \frac{\sum_{i=1}^{n} Q_i(z^k) x_i}{\sum_{i=1}^{n} Q_i(z^k)};$$

similarly, the derivative of l with respect to $\Sigma_k$ and $\alpha_k$ is found, respectively, and the derivative of l is set to 0 to solve for $\Sigma_k$ and $\alpha_k$:

$$\Sigma_k = \frac{\sum_{i=1}^{n} Q_i(z^k)(x_i - \mu_k)(x_i - \mu_k)^T}{\sum_{i=1}^{n} Q_i(z^k)};$$

$$\alpha_k = \frac{\sum_{i=1}^{n} Q_i(z^k)}{n}.$$

7. The method of claim 1, wherein Monte Carlo method is adopted for the random sampling to generate the primitive scenes;

a random variable X is supposed to represent scenes generated by the Monte Carlo method; x is a scene sample of X and obeys the distribution of a probability density function $f(x)$; W is supposed to be a set of high-risk scenes; in order to select the high-risk scenes from the generated scenes, an indicator function $h(x)$ of the high-risk scenes is defined as:

$$h(x) = \begin{cases} 1, x \in W \\ 0, x \notin W; \end{cases}$$

an expectation of the indicator function $h(x)$ in the overall scene C is $\mu$, and a variance is $\sigma^2$;

under the condition of importance sampling, the expectation $\mu$ is expressed as:

$$\mu = \int h(x) f(x) dx$$
$$= \int h(x) \frac{f(x)}{g(x)} g(x) dx$$
$$= \int (h(x) \omega(x)) g(x) dx;$$

a probability of occurrence of the high-risk scenes in the overall scene is supposed to be p, and the expectation $\mu$ of $h(x)$ is equal to p, and the variance $\sigma^2$ is equal to $p(1-p)$; $g(x)$ is a distribution with a higher probability of occurrence of the high-risk scenes, where $$\omega(x) = \frac{f(x)}{g(x)}$$

is called an importance ratio;

the Monte Carlo method is adopted to generate n groups of scene samples $x_i$, $i = 1, \ldots, n$; when a sample size is large, in terms of the law of Large Numbers, a sample mean $\hat{\mu}$ of $h(x)$ is converged to the expectation $\mu$ with the probability of 1, and a Monte Carlo estimator $\mu_{IS}$, of the expectation $\mu$ of the $h(x)$ is expressed as:

$$\hat{\mu}_{IS} = \frac{1}{n} \sum_{i=1}^{n} h(x_i) \omega(x_i), x_i \sim g(x).$$

8. A device for constructing autonomous driving test scenes based on primitive scenes, comprising:
   a primitive extraction module, configured to extract primitive scenes from real traffic scenes to establish a primitive scene description model;
   a variable estimation module, configured to estimate the distribution of description variables of the primitive scenes in the primitive scene description model by using a Gaussian Mixture Model;
   a primitive scene generation module, configured to select values of description variables from distribution intervals of the description variables of the primitive scenes according to the primitive scene description model, and randomly sample the description variables by adopting an importance sampling based Monte Carlo method to generate test primitive scenes; and
   a test scene generation module, configured to determine parameters of elements of a test scene according to a test task, and recombine the test primitive scenes to generate the test scene.

9. A terminal, comprising:
a storage device;
a processor; and
a computer program stored in the storage device and executed by the processor;
wherein the computer program, when executed by the processor, causes the processor to execute the method of claim 1.

10. A non-transitory computer-readable storage medium having a computer program stored thereon, wherein the computer program causes the processor to execute the method of claim 1.

* * * * *